United States Patent
Ichikawa et al.

(10) Patent No.: US 12,534,138 B2
(45) Date of Patent: Jan. 27, 2026

(54) VEHICLE FRONT STRUCTURE

(71) Applicant: Mazda Motor Corporation, Hiroshima (JP)

(72) Inventors: Hiroto Ichikawa, Aki-gun (JP); Yasushi Ishikawa, Aki-gun (JP); Hiroshi Suemura, Aki-gun (JP); Shamit Ramakrishnan, Aki-gun (JP); Hiroyuki Saiki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 19/057,056

(22) Filed: Feb. 19, 2025

(65) Prior Publication Data
US 2025/0304173 A1 Oct. 2, 2025

(30) Foreign Application Priority Data
Mar. 28, 2024 (JP) .................................. 2024-054696

(51) Int. Cl.
*B62D 21/15* (2006.01)

(52) U.S. Cl.
CPC .................................. *B62D 21/152* (2013.01)

(58) Field of Classification Search
CPC ......... B60K 5/1275; B50K 1/00; B60L 3/007; B62D 25/082
USPC .................................................. 180/312, 232
See application file for complete search history.

(56) References Cited

U.S. PATENT DOCUMENTS

| 6,722,696 | B2* | 4/2004 | Sonomura | B60K 5/1216 180/312 |
| 7,658,254 | B2* | 2/2010 | Buchwitz | B60R 21/0136 180/274 |
| 10,858,044 | B2* | 12/2020 | Sawatzki | B62D 21/152 |
| 11,254,274 | B1* | 2/2022 | Allbee | B62D 21/11 |
| 2017/0144637 | A1* | 5/2017 | Mashiki | B60R 21/09 |

FOREIGN PATENT DOCUMENTS

| EP | 4624210 A1 | 10/2025 |
| JP | 2009090818 A | 4/2009 |
| JP | 2011126363 A * | 6/2011 |

(Continued)

OTHER PUBLICATIONS

Computer generated English translation of JP 2021-079765 (Year: 2025).*

(Continued)

*Primary Examiner* — Paul N Dickson
*Assistant Examiner* — Tiffany L Webb
(74) *Attorney, Agent, or Firm* — Alleman Hall & Tuttle LLP

(57) ABSTRACT

To enhance safety of an occupant by suppressing rearward movement of an auxiliary machine during a vehicle frontal collision, a front structure of a vehicle includes an inverter arranged in a compartment in a front portion of the vehicle, and a brake booster arranged at a position that is behind the inverter and overlaps the inverter when seen in a vehicle front-rear direction. A protector is attached to a portion that is a rear end portion of the inverter and opposes the brake booster. The protector includes a guide portion having an inclined surface that abuts the brake booster in conjunction with rearward movement of the inverter and displaces the brake booster upward.

11 Claims, 14 Drawing Sheets

(56) References Cited

FOREIGN PATENT DOCUMENTS

| | | | | |
|---|---|---|---|---|
| JP | 2012206627 | A | * | 10/2012 |
| JP | 5772489 | B2 | * | 9/2015 |
| JP | 2018111420 | A | | 7/2018 |
| JP | 2021079765 | A | * | 2/2021 |

OTHER PUBLICATIONS

Computer generated English translation of JP 2011126363 (Year: 2025).*
Computer generated English translation of JP 2012206627 (Year: 2025).*
Computer generated English translation of JP 5772489-B2 (Year: 2025).*

* cited by examiner

VEHICLE FRONT STRUCTURE

TECHNICAL FIELD

The present disclosure relates to a vehicle front structure that includes a travel motor and a power converter for converting electric power in a front space of a vehicle.

BACKGROUND ART

Electric vehicles such as electric cars and hybrid vehicles, each of which includes a travel motor and a power converter in a front space (front compartment) of the vehicle, have been well known. The power converter is a device that orthogonally converts electric power between a battery and the travel motor.

In order to reduce loss of the electric power supplied to the travel motor, the power converter is often arranged on top of the travel motor or the like from a viewpoint of space efficiency.

In this structure, when a frontal collision of the vehicle (referred to as a vehicle frontal collision) occurs, the power converter may move rearward together with the travel motor, interfere (collide) with an auxiliary machine arranged behind the power converter, and consequently damage the power converter and the auxiliary machine. A structure including a protector in a power converter is disclosed in JP2018-111420A in order to prevent damage to the power converter (power control unit) caused by such a collision, in detail, to prevent damage to a connector that is provided above and behind the power converter.

SUMMARY OF INVENTION

Technical Problem

It is considered that, during the vehicle frontal collision, the auxiliary machine may move rearward when the power converter moves rearward together with the travel motor and collides with the auxiliary machine. In this case, the auxiliary machine may possibly move further rearward with a dashboard and enter a cabin.

Accordingly, from a viewpoint of occupant protection, even when such a situation that the power converter collides with the auxiliary machine occurs, it is desired to avoid rearward movement of the auxiliary machine. However, the structure is not devised just as described in JP2018-111420A.

The present disclosure has been made in view of the circumstance as described above and therefore has a purpose of suppressing rearward movement of an auxiliary machine during a vehicle frontal collision and thus to enhance safety of an occupant in a vehicle front structure including a travel motor and a power converter.

Solution to Problem

The present disclosure has been made in view of the above problem, and is a vehicle front structure including a power converter that is arranged in a compartment in a front portion of a vehicle and converts electric power between a travel motor and a battery, and an auxiliary machine arranged at a position that is behind the power converter in the compartment and at which the auxiliary machine overlaps the power converter when seen in a vehicle front-rear direction, in which a guide member is attached to at least a portion of one of the power converter and the auxiliary machine, the portion opposing the other of the power converter and the auxiliary machine, and the guide member including an inclined surface that abuts the other in conjunction with rearward movement of the power converter during a vehicle frontal collision and thereby displaces the auxiliary machine relatively upward.

Here, "convert electric power" means that at least one of a voltage, a current, a frequency, a phase, and a number of the phases as variables of the electric power is converted into another form. For example, "convert electric power" means a conversion between DC power and AC power, a conversion to increase/reduce the voltage, or the like.

With this configuration, when the power converter moves rearward during the vehicle frontal collision, the auxiliary machine is displaced relatively upward along the inclined surface of the guide member that is attached to at least one of the power converter and the auxiliary machine. In this way, it is possible to avoid the auxiliary machine moving rearward and entering a cabin, and as a result, the safety of an occupant is improved.

It will be appreciated that the guide member can be attached to at least a portion of the power converter, the portion opposing the auxiliary machine, and the guide member can include an inclined surface that abuts the auxiliary machine in conjunction with rearward movement of the power converter during a vehicle frontal collision and thereby displaces the auxiliary machine relatively upward. Alternatively, the guide member can be attached to at least a portion of the auxiliary machine, the portion opposing the power converter, and the guide member can include an inclined surface that abuts the power converter in conjunction with rearward movement of the power converter during a vehicle frontal collision and thereby displaces the auxiliary machine relatively upward.

In the vehicle front structure, for example, the guide member is attached to a rear end portion of the power converter, and the inclined surface is raised forward in the vehicle front-rear direction.

With this configuration, since the guide member is attached to the rear end portion of the power converter, a direct collision between the power converter and the auxiliary machine is avoided. As a result, the power converter is less likely to be damaged, which is advantageous to avoid power leakage and the like caused by the damage to the power converter.

In this case, the power converter can include a circuit unit converting the electric power and a converter housing accommodating the circuit unit, the circuit unit being fixed to an upper portion of a drive system including the motor via the converter housing, and the guide member can be attached to the converter housing.

With this configuration, since the power converter is fixed to the drive system having a relatively high rigidity via the converter housing, support rigidity of the guide member that is attached to the power converter is improved. Thus, when the power converter moves rearward, it is possible to further reliably displace the auxiliary machine relatively upward along the guide member (inclined surface).

In this case, the converter housing can include a lower housing fixed to the drive system and an upper housing joined to the lower housing, and the guide member can be attached to the lower housing.

With this configuration, in the converter housing, a collision load between the power converter and the auxiliary machine is input to a position near the drive system. Thus, the collision load can be promptly distributed from the converter housing to the drive system, and as a result, the damage to the power converter and the guide member is suppressed.

In this case, the lower housing can include a fastening portion formed therearound to be thicker than another portion and fastened to the drive system by a fastening member, and the guide member can be attached to the fastening portion or a portion adjacent to the fastening portion.

With this configuration, the guide member is attached to the fastening portion, which is a portion having high strength and is in close contact with the drive system, or the portion adjacent to the fastening portion. Thus, it is possible to further reliably transmit the collision load to the drive system via the lower housing and to highly suppress the damage to the power converter and the guide member.

In the configuration in which the guide member is attached to the converter housing, the converter housing can include a first wall portion including a surface opposing the auxiliary machine in the vehicle front-rear direction and a second wall portion extending forward in the vehicle front-rear direction from one end of the first wall portion, and the guide member can be attached to the first wall portion in an area including the one end.

In this configuration, the guide member is attached to one end of the first wall portion, which is a portion having relatively high bearing strength in the vehicle front-rear direction, that is, to an area including a rear end portion of the second wall portion extending in the vehicle front-rear direction. Thus, the collision load can be distributed while being received by the second wall portion, which is advantageous to suppress deformation of the converter housing and thus to suppress the damage to the power converter.

In the configuration in which the guide member is attached to the converter housing, the guide member can include a body portion having the inclined surface and a leg fixed to the converter housing, and the body portion can be separated from the converter housing.

With this configuration, the collision load between the guide member and the auxiliary machine is input from the body portion to the converter housing via the leg. That is, it is avoided that the collision load is directly input to the converter housing from the portion (that is, the body portion) to which the collision load is input. Thus, the converter housing is less likely to be damaged by the collision load, which is advantageous to avoid the damage to the power converter.

In this case, the leg can have a portion extending forward in the vehicle front-rear direction along the direction perpendicular to the plane of the inclined surface.

With this configuration, the collision load that is input to the body portion is efficiently transmitted to the converter housing. Thus, the collision load can be promptly transmitted to the drive system, which is further advantageous to suppress the damage to the power converter.

In the above-described configuration, the auxiliary machine may be configured to have a front-upward inclined surface that opposes the inclined surface of the guide member in the vehicle front-rear direction.

With this configuration, when the guide member and the auxiliary machine collide with each other, the inclined surfaces (the front-upward inclined surfaces) in the same form abut each other. Thus, it is possible to smoothly displace the auxiliary machine relatively upward, which is advantageous to suppress the rearward movement of the auxiliary machine.

In each of the configurations described above, for example, the auxiliary machine is a brake booster. The brake booster is arranged near feet of the occupant. Thus, there is a possibility that lower limbs of the occupant are damaged when the brake booster moves rearward and enters the cabin during the vehicle frontal collision. Accordingly, each of the configurations described above is particularly useful in such a case where the auxiliary machine is the brake booster.

Advantageous Effects of Invention

According to the present disclosure that has been described so far, in the vehicle front structure including the travel motor and the power converter, it is possible to suppress the rearward movement of the auxiliary machine during the vehicle frontal collision and thus to further enhance the safety of the occupant.

BRIEF DESCRIPTION OF DRAWINGS

FIGS. 9A and 9B include views of an inverter alone in a state where the protector is detached, in which FIG. 9A is a perspective view, and FIG. 9B is a back view thereof.

DESCRIPTION OF EMBODIMENTS

A detailed description will be provided for an embodiment of the invention with reference to the drawings. The present embodiment exemplifies the invention, and the invention is not limited to the following embodiment in any respect except for an essential configuration thereof.

Configuration of Vehicle V

Figure 1:
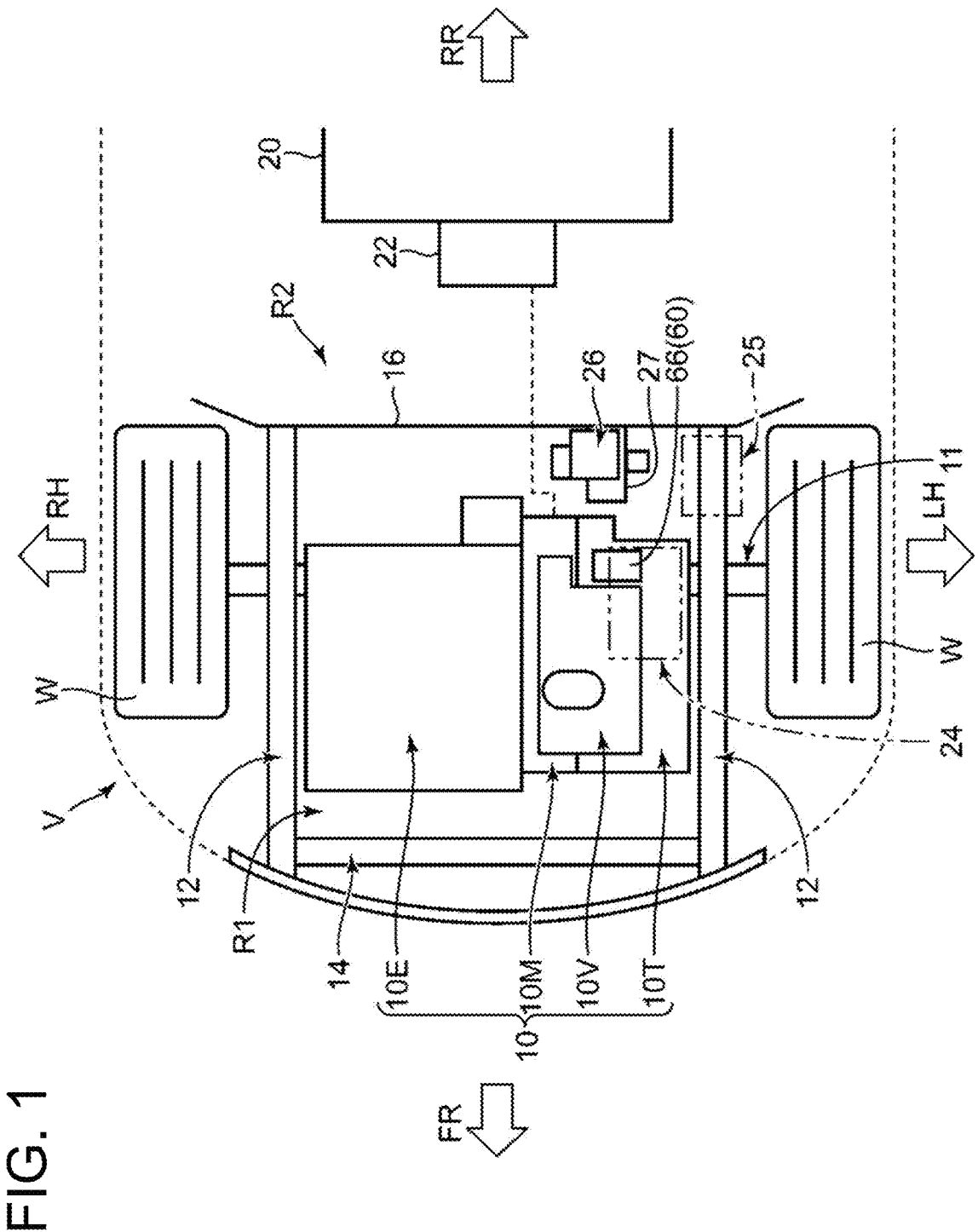
FIG. 1 is a plan view illustrating a schematic configuration of a vehicle, to which the present disclosure is applied.
Figure 2:
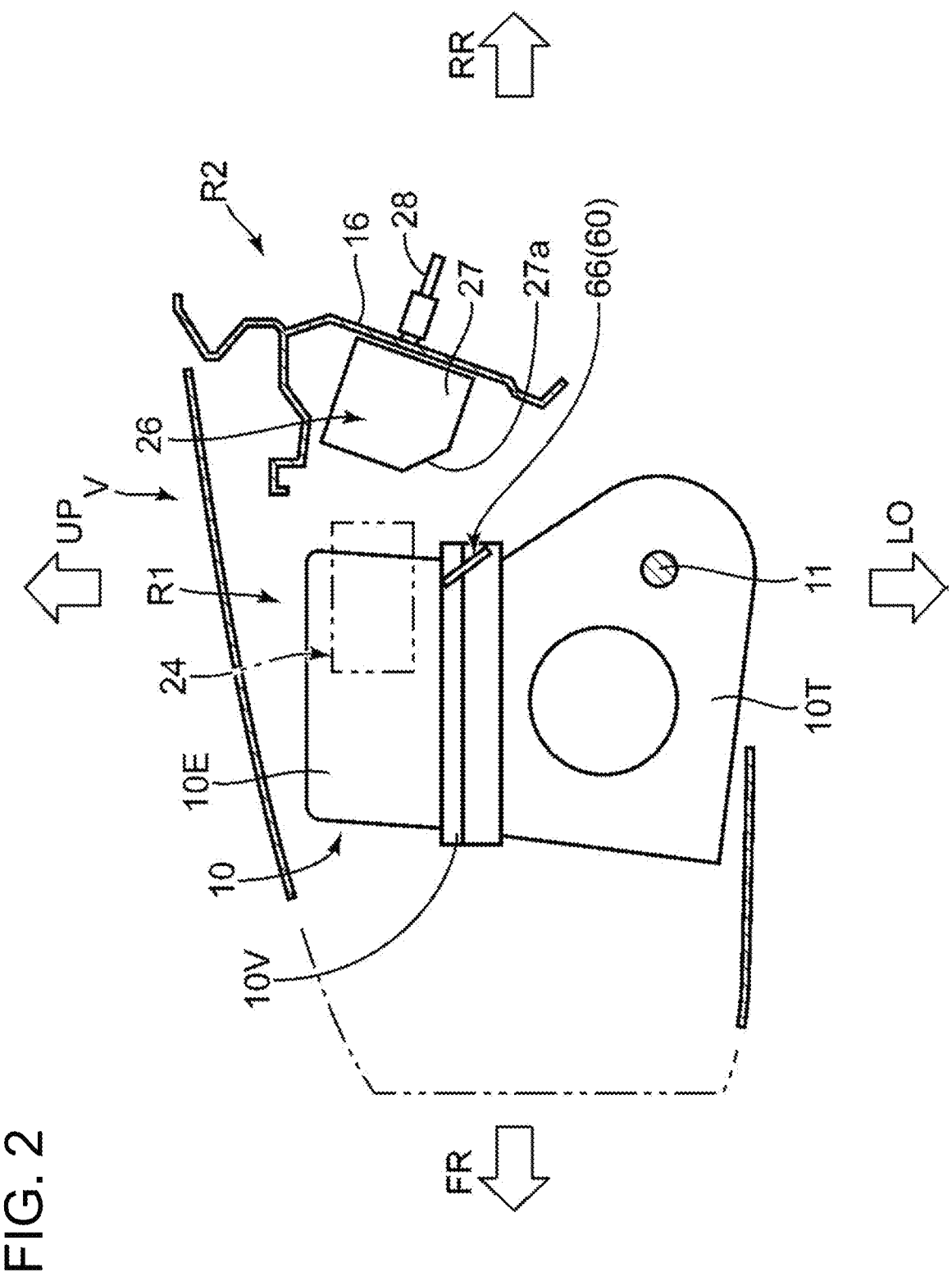
FIG. 2 is a cross-sectional view illustrating a schematic configuration of the vehicle.

FIG. 1 is a plan view illustrating a schematic configuration of a vehicle V, to which a front structure according to the present disclosure is applied, and FIG. 2 is a cross-sectional view illustrating the schematic configuration of the vehicle V. In the drawings used in the following description, "FR" indicates a vehicle front direction, "RR" indicates a vehicle rear direction, "LH" indicates a vehicle left direction, "RH" indicates a vehicle right direction, "UP" indicates a vehicle up direction, and "LO" indicates a vehicle down direction. In addition, unless otherwise specifically described, a "front-rear direction" refers to a front-rear direction of the vehicle V.

The vehicle V illustrated in FIG. 1 is a hybrid electric vehicle (HEV) that has an engine 10E and a motor 10M as drive sources for travel (that is, drive sources of wheels W). However, the vehicle according to the present disclosure is not limited to the hybrid electric vehicle, and may be an electric vehicle (EV).

The vehicle V includes a powertrain 10 that includes the engine 10E, the motor generator 10M, a transaxle 10T, an inverter 10V, and the like. The powertrain 10 is arranged in a compartment R1 (also referred to as a powertrain room) that is provided in a front portion of the vehicle V. More specifically, in plan view, the powertrain 10 is arranged in a space that is surrounded by a pair of left and right front side frames 12 extending in the vehicle front-rear direction, a front cross member 14 coupling front end portions of both of the front side frames 12 in a vehicle width direction, and a dashboard 16. The dashboard 16 is a partition wall that separates the compartment R1 and a cabin R2.

The motor generator 10M (hereinafter referred to as the motor 10M) is a three-phase three-wire alternating current (AC) motor that rotates when being supplied with three-phase AC power, and includes an output shaft coupled to the engine 10E via an electromagnetic clutch (not illustrated), a rotor having a permanent magnet disposed around the output shaft, and a stator core disposed on an outer periphery of the rotor and in which a coil is wound around each of a plurality of teeth. The plurality of coils includes a U-phase coil, a V-phase coil, and a W-phase coil, and currents in mutually different phases are supplied to the coils of the respective phases.

The transaxle 10T is connected to the motor 10M, and includes a transmission that decelerates rotation input from the motor 10M and a differential gear that further distributes the rotation decelerated by the transmission into the left and right wheels W. A rotational driving force generated by the engine 10E or the motor 10M is output from the differential gear to a driveshaft 11 and is transmitted to the wheels W.

The vehicle V according to the present embodiment is a parallel hybrid electric vehicle, for example, and is capable of traveling only by the driving force of the motor 10M, traveling by the driving forces of both of the motor 10M and the engine 10E, and traveling only by the driving force of the engine 10E by turning on/off the electromagnetic clutch. During the deceleration of the vehicle V, the motor 10M generates electric power by rotational forces of the wheels W.

A battery 20 is arranged under a floor of the cabin R2 that is located behind and separated from the compartment R1 with the dashboard 16 being interposed therebetween. The battery 20 exchanges the electric power with the motor 10M. When the motor 10M functions as a drive source for travel, the battery 20 supplies the electric power to the motor 10M. In this case, direct current (DC) power is supplied to the battery 20 via a DC/DC converter 22 that is provided in a power supply path between the battery 20 and the motor 10M. Meanwhile, when the motor 10M functions as the generator during the deceleration of the vehicle V, the battery 20 stores the electric power generated by the motor 10M.

The inverter 10V is arranged on top of the motor 10M and the transaxle 10T, and is connected to the motor 10M. The inverter 10V is a power converter that converts the DC power from the battery 20 into AC power and supplies the AC power to the motor 10M. More specifically, the inverter 10V converts the DC power, which is supplied from the battery 20 via a DC circuit including the DC/DC converter 22, into three-phase AC power, and supplies the three-phase AC power to the motor 10M.

When the motor 10M functions as the generator during the deceleration of the vehicle V, the inverter 10V converts the AC power (regenerative power), which is generated by the motor 10M, into the DC power, and supplies the DC power to the battery 20 via the DC circuit including the DC/DC converter 22.

Although indicated by imaginary lines in FIGS. 1 and 2 for convenience of description, the vehicle V also includes a battery for supplying the electric power to an electrical component and the like provided in each portion of the vehicle V, in addition to the battery 20 for the power supply to the motor 10M. That is, the vehicle V includes an auxiliary battery 24 in addition to the battery 20 that supplies the electric power for travel. The auxiliary battery 24 has a lower nominal voltage than the battery 20.

For example, the battery 20 is a lithium-ion battery or a nickel-metal hydride battery having a nominal voltage of 24 V or higher, and the auxiliary battery 24 is a lead battery or a lithium-ion battery having a nominal voltage of 12 V.

The auxiliary battery 24 is arranged above the inverter 10V. More specifically, in the plan view, the battery 24 is arranged at a position to cover an attachment portion (protector attachment portion 47) of a protector 60, which will be described below, in the inverter 10V from above.

In the compartment R1, a brake booster 26 is arranged behind the powertrain 10, more specifically, behind the inverter 10V. The brake booster 26 is an example of an auxiliary machine that is arranged behind the inverter 10V in the compartment R1. As illustrated in FIG. 2, a lower portion of the brake booster 26 is located at substantially the same height as the inverter 10V. That is, the brake booster 26 is arranged at a position at which the lower portion thereof overlaps the inverter 10V when seen in the front-rear direction.

The brake booster 26 is a booster that amplifies a brake pedal operation force (depression force) by an occupant and transmits the amplified force to a brake unit (master cylinder). The brake booster 26 includes a booster body 27 and an input portion 28 for inputting the depression force by the occupant to the booster body 27.

The booster body 27 is fixed to a front surface (a side surface on the compartment R1 side) of the dashboard 16 via a bracket, and the input portion 28 protrudes to a leg area below a driver's seat in the cabin R2 through an opening formed in the dashboard 16. The brake pedal, which is not illustrated, is coupled to this input portion 28.

A powertrain control module (PCM) 25 is further mounted on the vehicle V. The PCM 25 is a controller that comprehensively controls the powertrain 10 including the motor 10M and the engine 10E.

Arrangement of Inverter 10V

Figure 3:
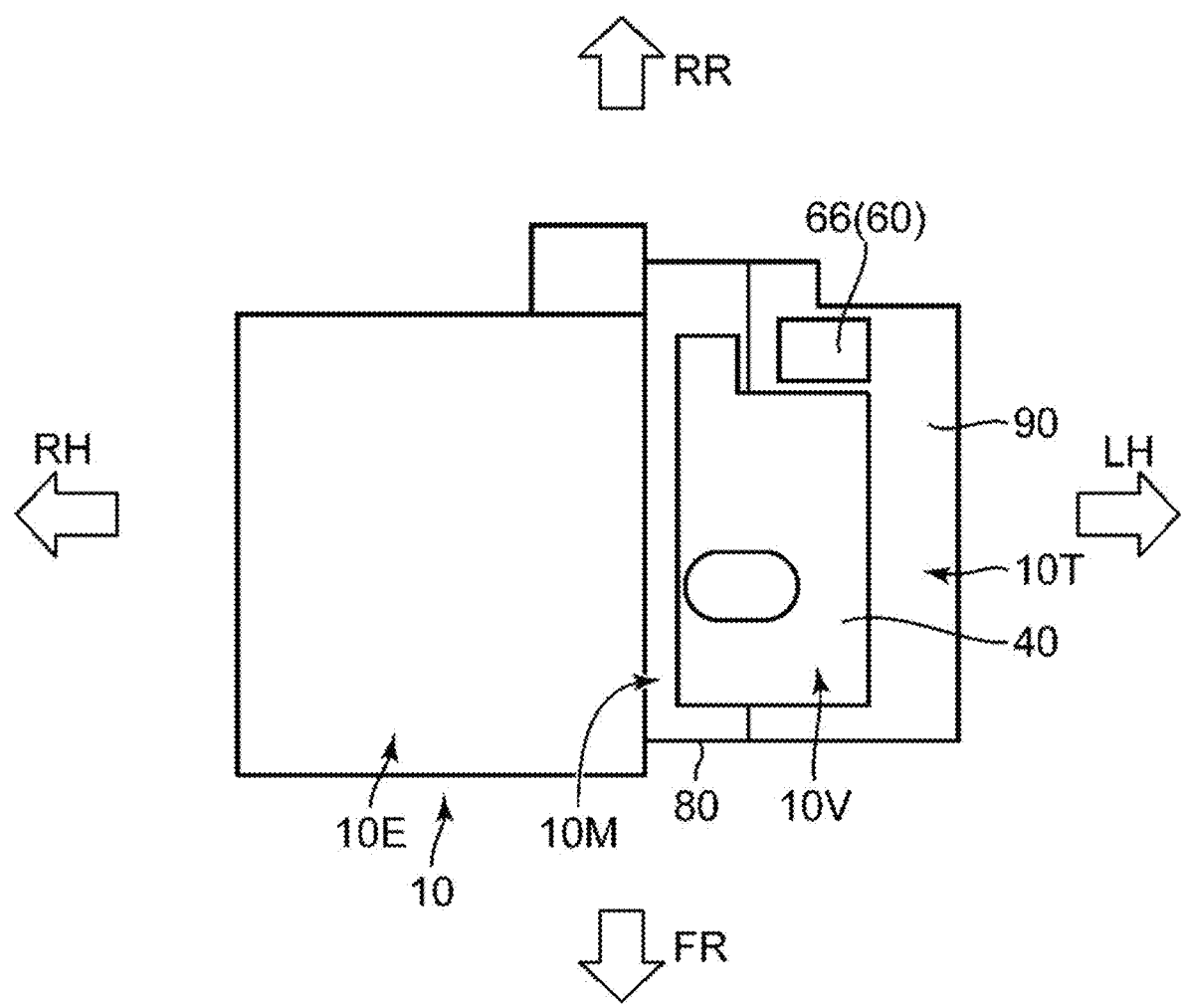
FIG. 3 is a schematic plan view of a powertrain that includes an inverter.

FIG. 3 is a plan view of the powertrain 10 that includes the inverter 10V. As illustrated in FIG. 3, the powertrain 10 includes the engine 10E, the motor 10M, and the transaxle 10T in an order from the right side of the vehicle.

The engine 10E is a multi-cylinder reciprocating engine, for example, and is arranged in a so-called horizontal posture in which a crankshaft extends in the vehicle width direction. The motor 10M is arranged on a left side adjacent to a cylinder block of this engine 10E. The motor 10M has a motor housing 80 that constitutes an outer shell thereof.

The motor housing 80 is joined to the cylinder block, and the motor 10M is thereby assembled to the engine 10E.

The transaxle 10T has a transaxle housing 90 that constitutes an outer shell thereof. This transaxle housing 90 is joined to the motor housing 80, and the transaxle 10T is thereby assembled to the motor 10M.

The motor housing 80 and the transaxle housing 90 are each made of a highly rigid metallic material such as die-cast aluminum or a highly rigid resin material such as carbon fiber reinforced resin. Accordingly, the motor 10M and the transaxle 10T are highly rigid drive systems using the motor 10M as a drive source.

The inverter 10V is arranged at a position that is on top of the powertrain 10 and extends across the motor 10M and the transaxle 10T.

The inverter 10V has an inverter housing 40 (an example of a "converter housing" in the present disclosure) that constitutes an outer shell thereof. The inverter housing 40 is made of the resin material such as the metallic material or the carbon fiber reinforced resin. This inverter housing 40 is joined to an upper portion of the motor housing 80 and an upper portion of the transaxle housing 90, and the inverter 10V is thereby integrally assembled to both of the motor 10M and the transaxle 10T. That is, the inverter 10V is fixed to an upper portion of the highly rigid drive system.

Figure 4:
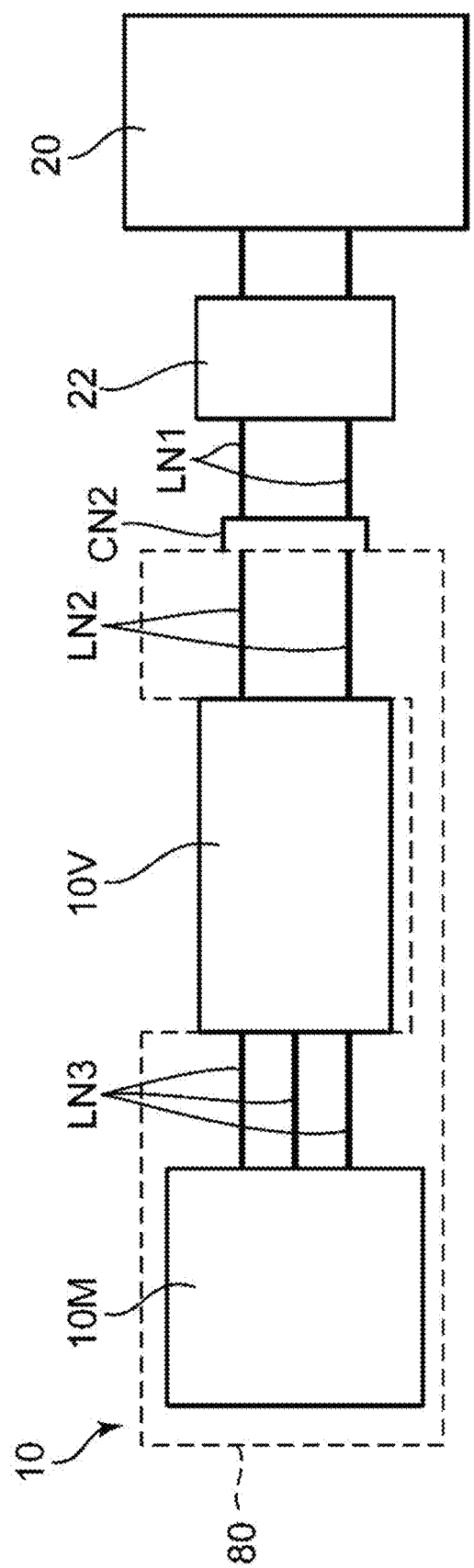
FIG. 4 is a view illustrating a power supply path from a battery.

FIG. 4 is a view illustrating electrical connection between the battery 20 and the powertrain 10. The battery 20 is connected to the powertrain 10 via the DC/DC converter 22. The DC power from the battery 20 is supplied to the inverter 10V via the DC/DC converter 22, is converted into the AC power, and is supplied to the motor M. During the deceleration of the vehicle V, the AC power that is generated by the motor 10M is converted into the DC power by the inverter 10V, and is then supplied to the battery 20 via the DC/DC converter 22.

The inverter 10V and the DC/DC converter 22 are connected to each other via a DC wire LN1, which is a wire harness routed in a vehicle body, and a DC wire LN2, which is routed in the motor housing 80. The DC wire LN1 and the DC wire LN2 are coupled to each other by a connector CN2 that is provided in a rear portion of the motor housing 80. In the DC wire LN2, a predetermined range including an end portion on the inverter 10V side is configured with a bus bar. The bus bar is fastened to a terminal block 33 of a DC input/output unit 32, which will be described below, in the inverter 10V, and the DC wire LN2 is thereby connected to the inverter 10V.

The motor 10M and the inverter 10V are connected by an AC wire LN3. In the AC wire LN3, a predetermined range including at least an end portion on the inverter 10V side is configured with a bus bar. The bus bar is fastened to a terminal block of an AC input/output unit 38, which will be described below, in the inverter 10V, and the AC wire LN3 is thereby connected to the motor 10M.

Configuration of Inverter 10V

Figure 5:
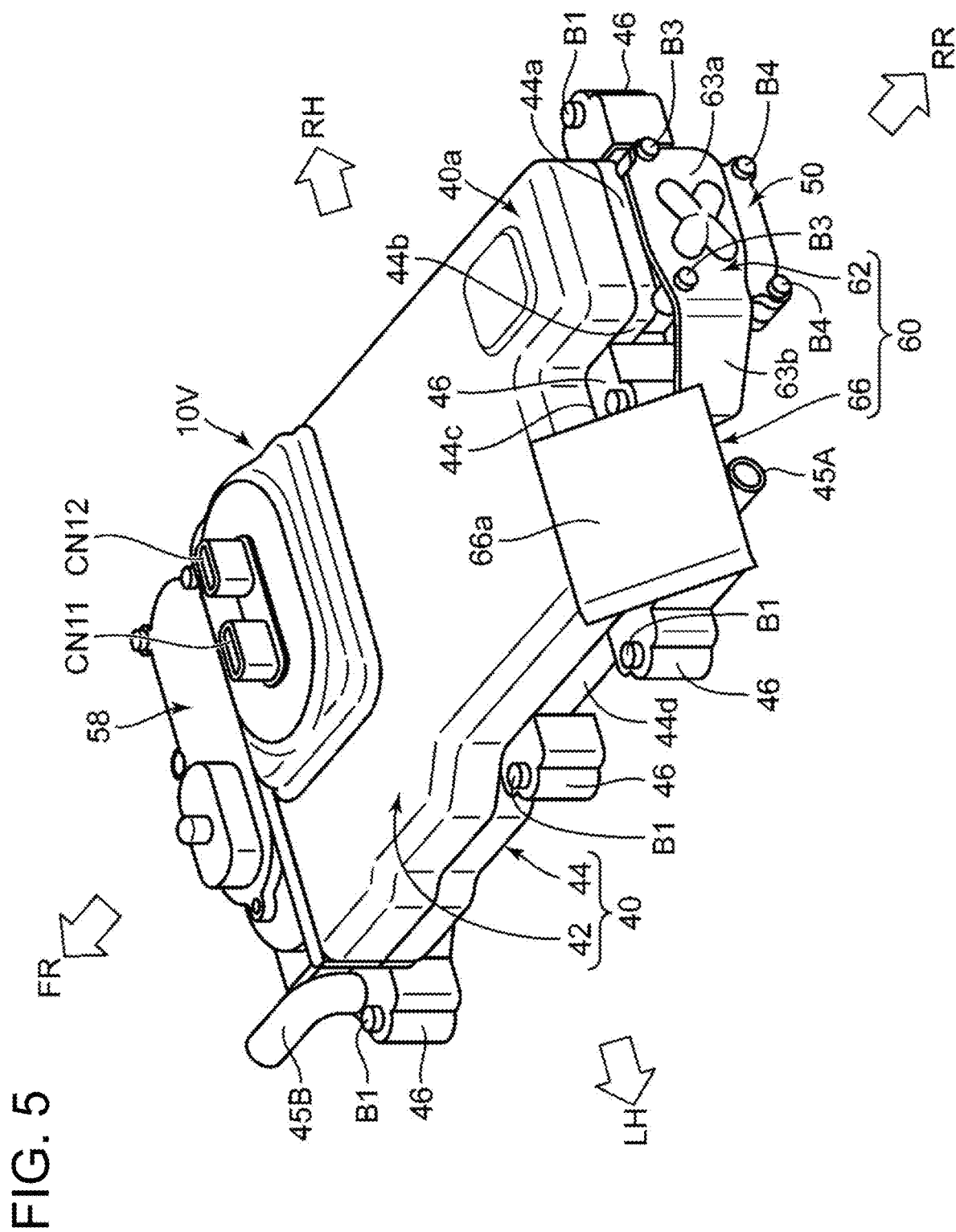
FIG. 5 is a perspective view of the inverter (in a state of including a protector).
Figure 6:
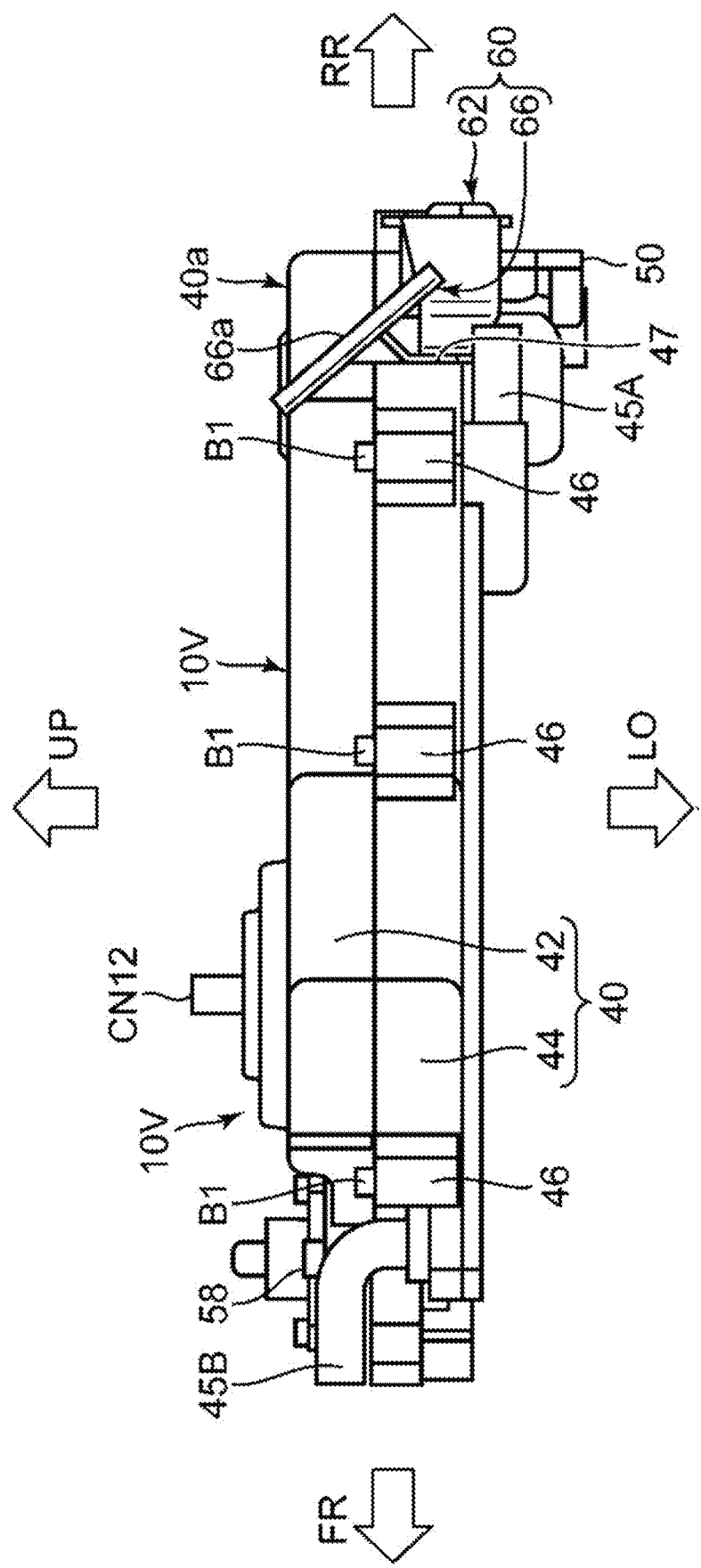
FIG. 6 is a side view of the inverter (in the state of including the protector).
Figure 7:
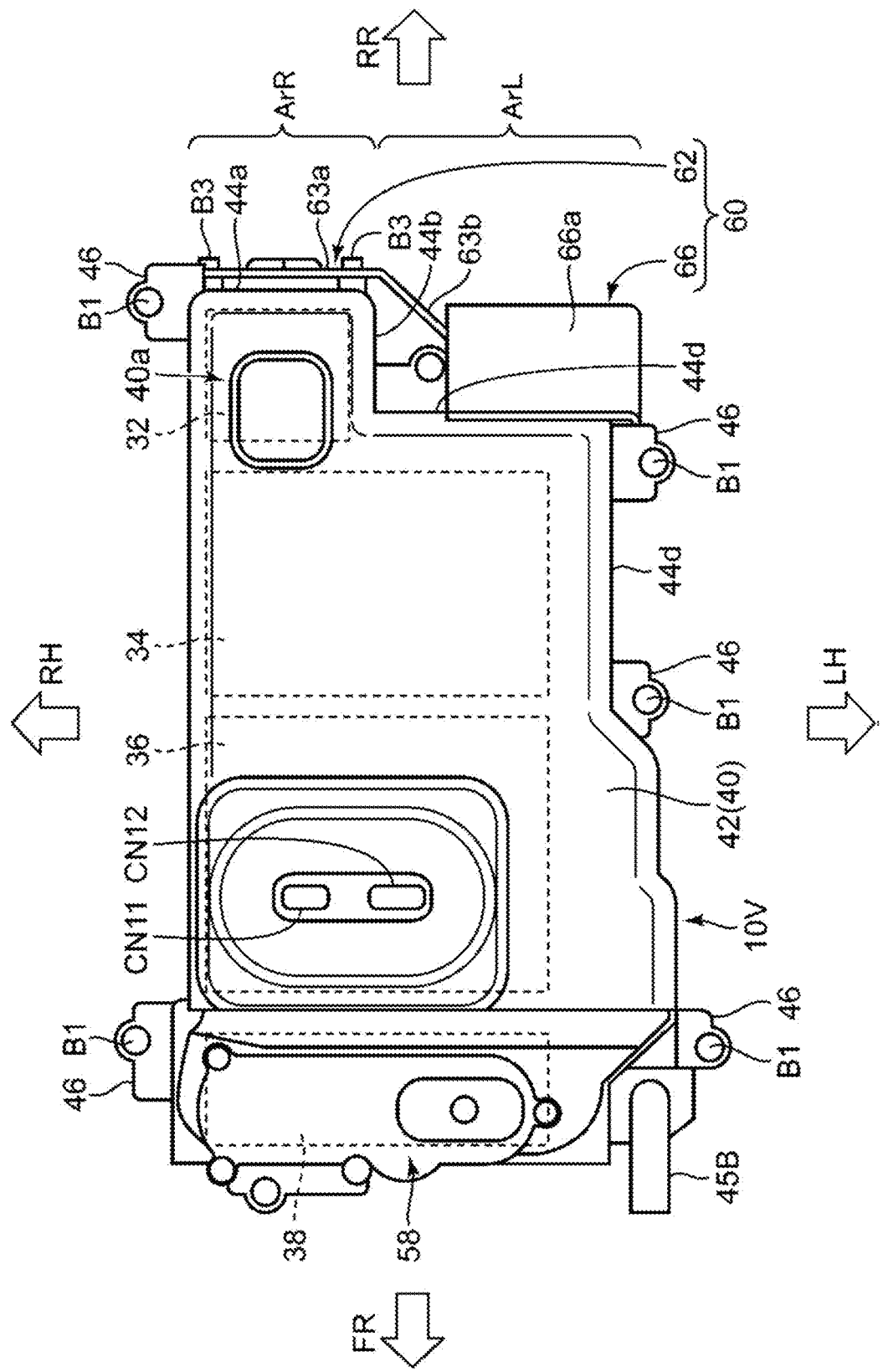
FIG. 7 is a plan view of the inverter (in the state of including the protector).
Figure 8:
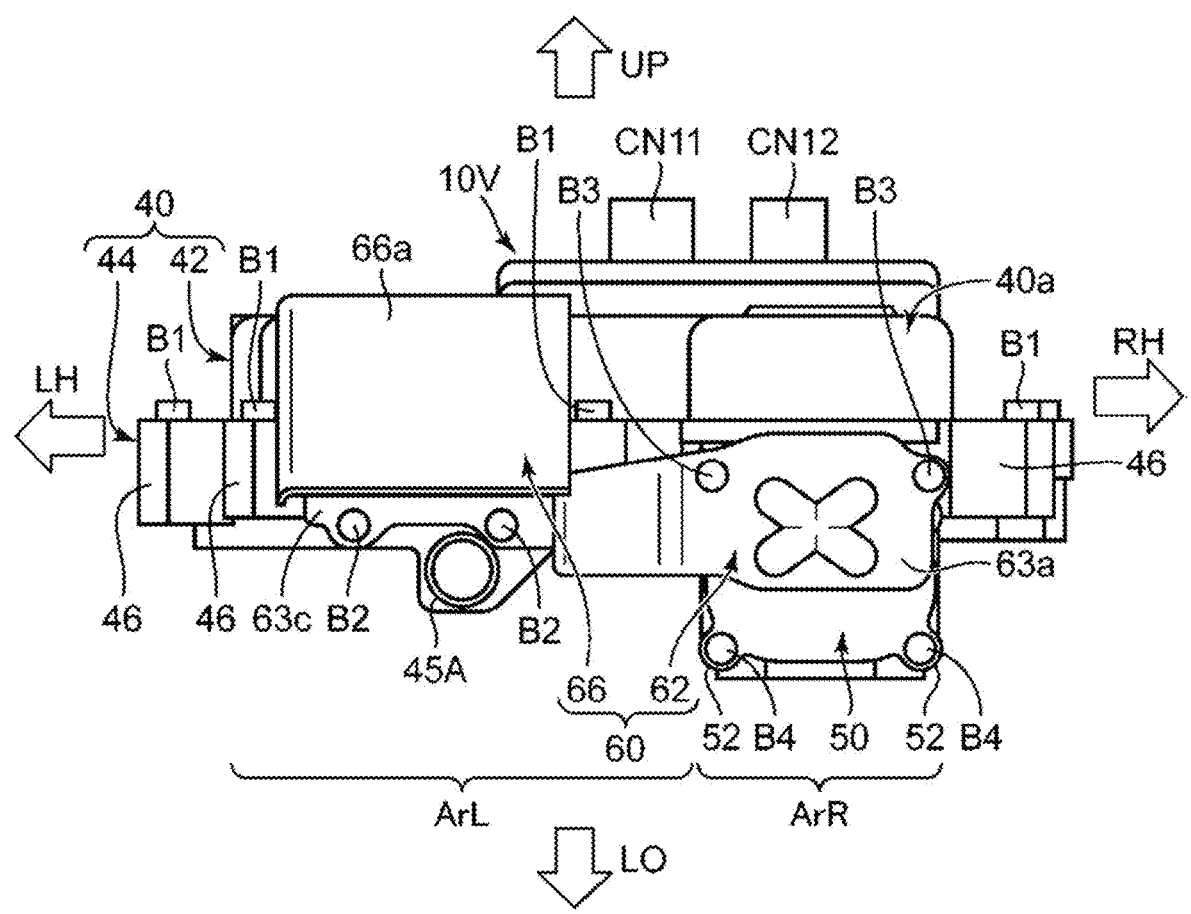
FIG. 8 is a back view of the inverter (in the state of including the protector).
Figure 9A:
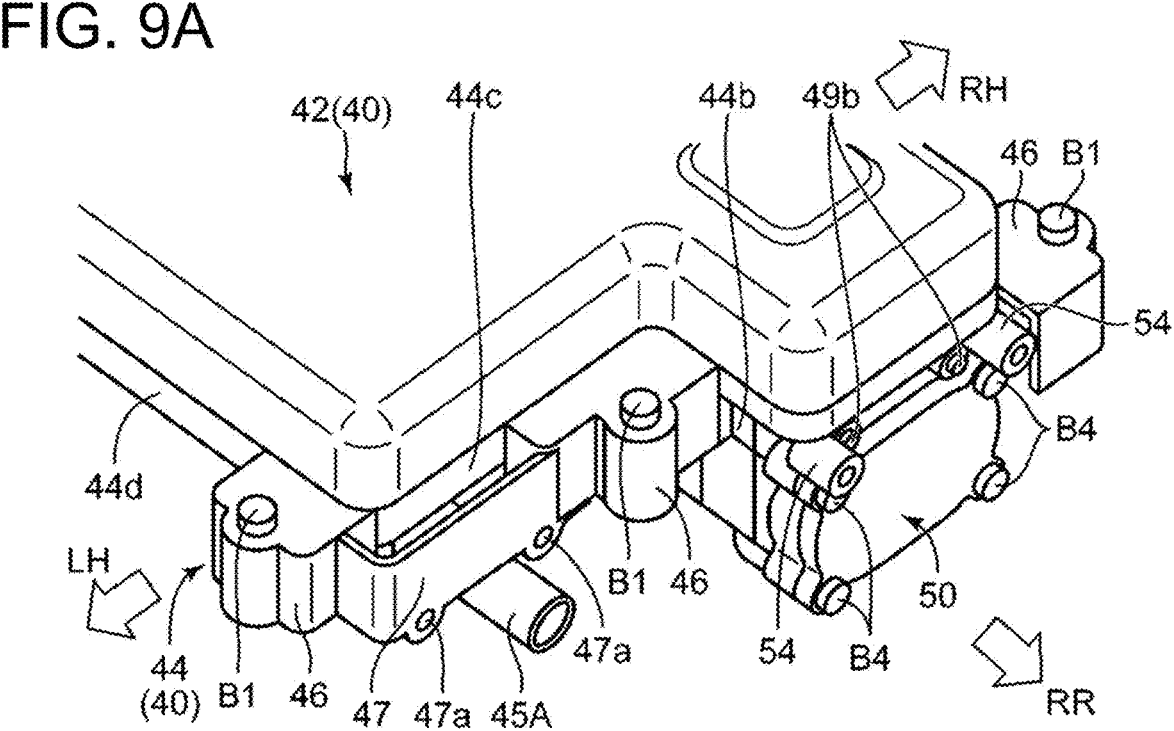
Figure 9B:
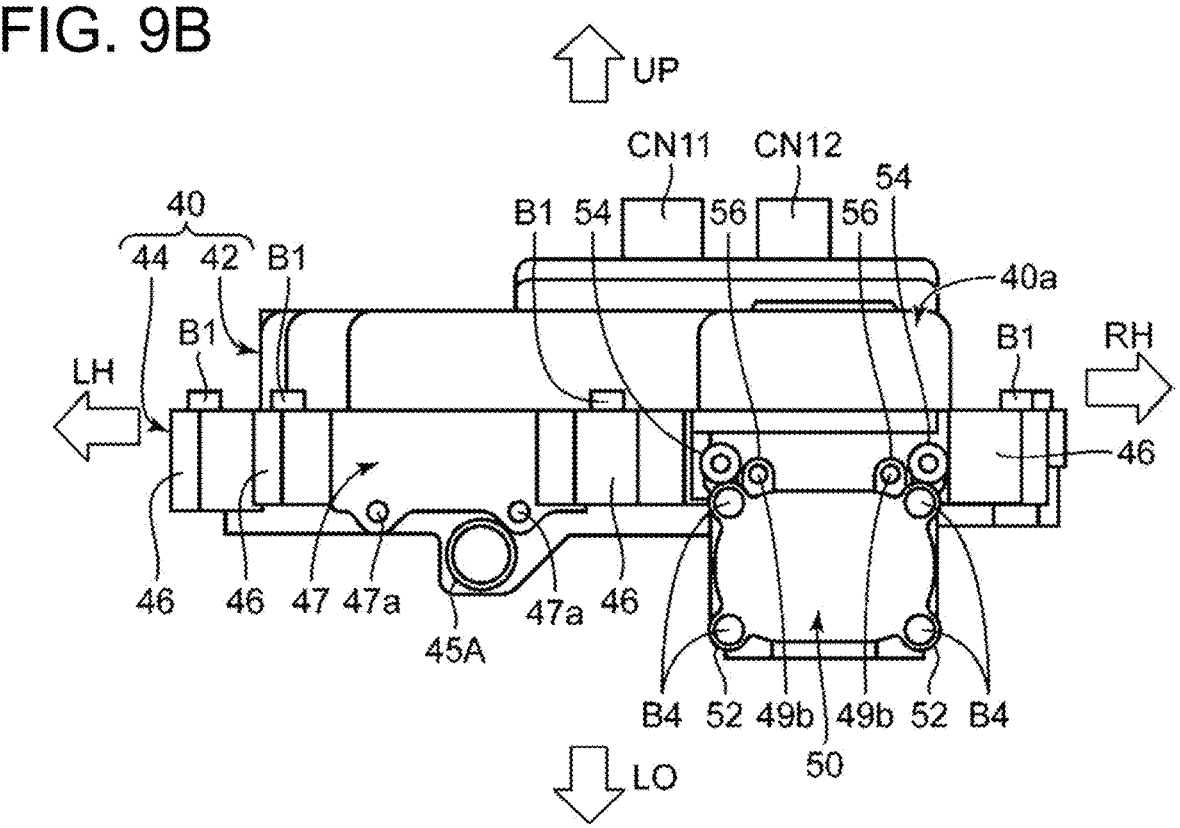
Figure 10:
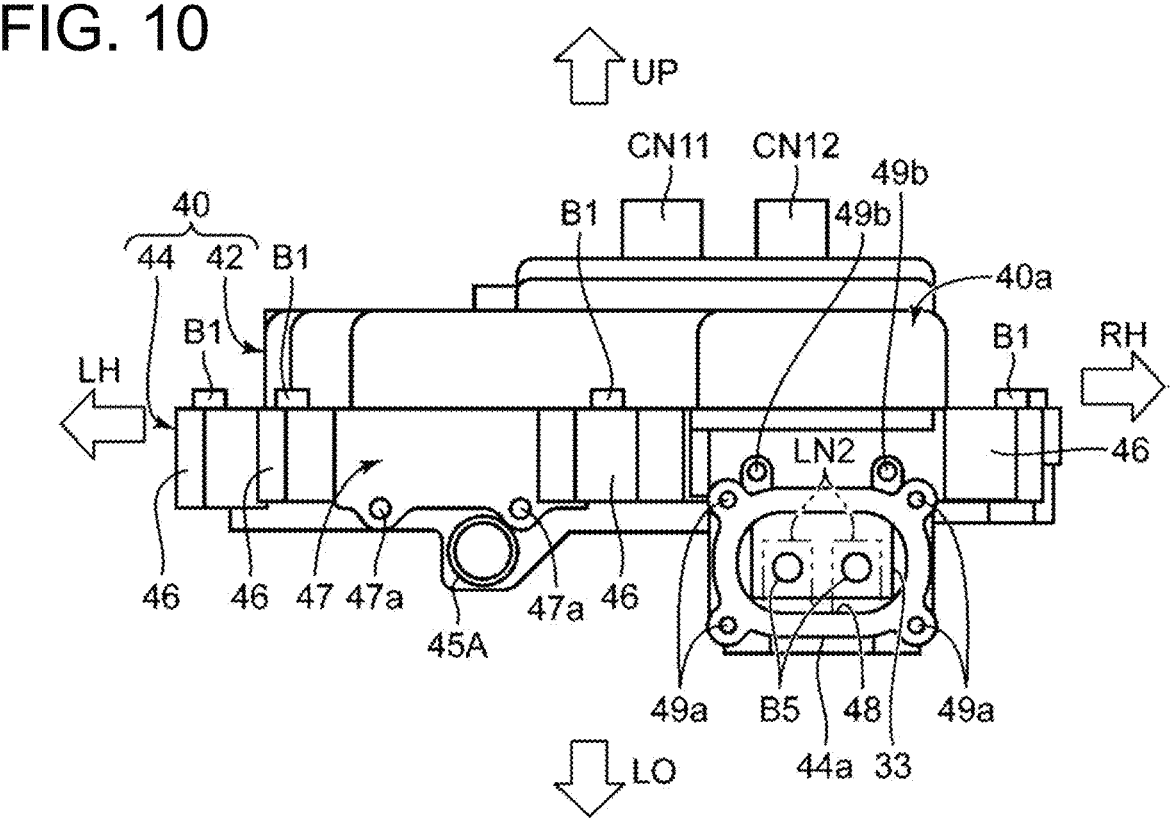
FIG. 10 is a back view of the inverter in a state where a lid is detached from an opening (service hole).

FIGS. 5 to 8 are views illustrating the inverter 10V in a state where the protector 60, which will be described below, is attached, FIG. 5 is a perspective view of the inverter 10V, FIG. 6 is a side view (side view seen from the left side) of the inverter 10V, FIG. 7 is a plan view of the inverter 10V, and FIG. 8 is a back view of the inverter 10V. FIGS. 9A and 9B include views of the inverter 10V in a state where the protector 60 is detached, in which FIG. 9A is a perspective view of the inverter 10V, and FIG. 9B is a back view of the inverter 10V. FIG. 10 is a back view of the inverter 10V in a state where a lid 50 for an opening 48, which will be described below, is detached.

As illustrated in FIGS. 5 to 8, the inverter 10V has the inverter housing 40 that is elongated in the front-rear direction and has a substantially rectangular shape in a plan view, and has a configuration that the protector 60 is attached to a rear end portion of this inverter housing 40.

The inverter housing 40 includes a dish-shaped upper housing 42 that has an upper surface portion and a peripheral wall portion extending downward from a peripheral edge of the upper surface portion, and a dish-shaped lower housing 44 that has a bottom surface portion and a peripheral wall portion extending upward from a periphery of the bottom surface portion. The upper housing 42 and the lower housing 44 are assembled to each other in the up-down direction, and thereby constitute the inverter housing 40. As described above, the inverter housing 40 is formed of the metallic material or the resin material such as the carbon fiber reinforced resin.

The inverter housing 40 (hereinafter, may also be simply referred to as the housing 40) includes a plurality of fastening portions 46 that are formed on a peripheral wall portion thereof, more specifically, the peripheral wall portion of the lower housing 44. Each of the fastening portions 46 is a portion that is formed to be thicker than the rest of the peripheral wall portion of the lower housing 44. A bolt B1 (fastening member) is fastened via a through hole formed in the respective fastening portion 46 when the bolt B1 can be screwed into a screw hole formed in respective one of the motor housing 80 and the transaxle housing 90. In this way, the inverter 10V is fixed (fastened) onto the top of the motor 10M and the transaxle 10T.

The upper housing 42 is provided with a plurality of PCM connectors CN11, CN12, each of which protrudes upward. Each of the PCM connectors CN1, CN12 is a connector for connecting the PCM 25 to the inverter 10V by electrical wiring.

As illustrated in FIG. 7, the inverter 10V includes the DC input/output unit 32, a smoothing unit 34, a power module unit 36, and the AC input/output unit 38 that are accommodated in the housing 40. The DC input/output unit 32, the smoothing unit 34, the power module unit 36, and the AC input/output unit 38 are disposed in this order from the rear side to the front side of the vehicle V. The DC input/output unit 32, the smoothing unit 34, the power module unit 36, and the AC input/output unit 38 are examples of a "circuit unit" in the present disclosure.

An opening, which is not illustrated, is provided in a lower surface of a front end portion of the lower housing 44. Through this opening, the AC wire LN3, which includes the bus bar, is inserted in the housing 40 and fastened to the terminal block of the AC input/output unit 38 by a bolt. By this fastening, the AC wire LN3 is connected to the inverter 10V. In FIG. 5, a lid 58 closes the opening that leads to a connection portion between the AC input/output unit 38 and the AC wire LN3, and is fixed to the upper housing 42.

As illustrated in FIG. 7, in the plan view of the inverter 10V, a partial area (referred to as a right area ArR) at a right end of a rear end portion of the housing 40 protrudes rearward from the rest of the area (referred to as a left area ArL) of the rear end portion of the housing 40. The DC input/output unit 32 is accommodated in a protruding portion 40a. An opening, which is not illustrated, is provided on a lower surface of the protruding portion 40a, that is, the lower surface of a portion, which corresponds to the protruding portion 40a, in the lower housing 44. Through this opening, the DC wire LN2, which includes the bus bar, is inserted in the protruding portion 40a.

The DC wire LN2 penetrates an upper wall portion of the motor housing 80, is inserted in the protruding portion 40a through the opening, which is not illustrated, and is fixed (fastened) to the terminal block 33 of the DC input/output unit 32 by a bolt B5. By this fastening, the DC wire LN2 is connected to the inverter 10V.

The horizontally long oval-shaped opening 48 is provided in a rear wall 44a of the lower housing 44 in the protruding portion 40a. The opening 48 is a service hole for access to the terminal block 33, that is, an electrical connection portion between the DC input/output unit 32, which is provided in the inverter 10V, and the DC wire LN2 (hereinafter, may also be referred to as a service hole 48). The service hole 48 is opened rearward and thus constitutes a path accessible to the terminal block 33 in the front-rear direction. That is, by inserting a tool through the service hole 48 from behind, the bolt B5 of the terminal block 33 can be attached/detached.

Figure 11:
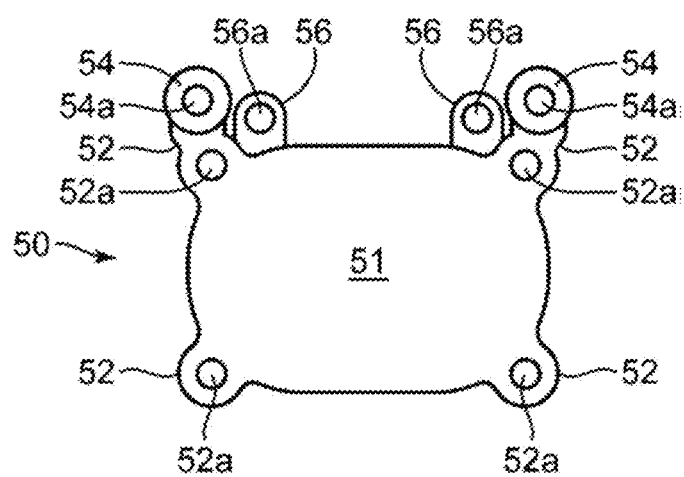
FIG. 11 is a back view (plan view seen from behind) of the lid.

As illustrated in FIGS. 9A and 9B, the service hole 48 is closed by the plate-shaped lid 50. FIG. 11 is a back view (plan view seen from behind) illustrating the lid 50 alone.

The lid 50 is formed of an insulating material such as a resin. As illustrated in FIG. 11, the lid 50 includes a substantially-rectangular lid body portion 51 that closes the service hole 48; four fixing protruding pieces 52, each of which extends outward from the lid body portion 51; and two temporary fixing protruding pieces 56. The fixing protruding pieces 52 are portions for fixing the lid 50 to the housing 40 (lower housing 44) and provided at four corners of the lid body portion 51. Meanwhile, the temporary fixing protruding pieces 56 are portions for temporarily fixing (temporarily placing) the lid 50 to the housing 40 before fixation of the lid 50. Between the two upper fixing protruding pieces 52, each of the temporary fixing protruding pieces 56 is provided adjacent to the respective fixing protruding piece 52.

As illustrated in FIG. 10, four screw holes 49a that correspond to the fixing protruding pieces 52, and a pair of temporary fixing pins 49b that correspond to the temporary fixing protruding pieces 56 are provided in a portion of the rear wall 44a around the service hole 48. The pair of temporary fixing pins 49b protrude rearward in parallel with each other from the rear wall 44a, and extend in an attachment/detachment direction of the lid 50, that is, the front-rear direction.

As illustrated in FIGS. 9A to 10, the temporary fixing pins 49b are inserted in pin holes 56a that are provided to the temporary fixing protruding pieces 56. In such a state, bolts B4 are screwed into the screw holes 49a via through holes 52a that are provided to the fixing protruding pieces 52, and the lid 50 is thereby fixed (fastened) to the rear wall 44a.

When the lid 50 is attached, the temporary fixing pins 49b are inserted in the pin holes 56a of the temporary fixing protruding pieces 56. In this way, prior to fastening by the bolts B4, the lid 50 can be temporarily fixed (temporarily placed) to the protruding portion 40a. This contributes to an improvement in assemblability of the inverter 10V.

The temporary fixing pins 49b and the pin holes 56a are set such that, when the lid 50 is moved along the pair of temporary fixing pins 49b in the front-rear direction substantially without inclination, the lid 50 can be attached/detached to/from the temporary fixing pins 49b.

Of the four fixing protruding pieces 52, the two upper fixing protruding pieces 52 have a different configuration from the two lower fixing protruding pieces 52. That is, as illustrated in FIG. 11, the two upper fixing protruding pieces 52 are each provided with an extending portion that extends further outward from a position of the respective through hole 52a, and boss portions 54 are each provided at an end of the respective extending portion.

Each of the boss portions 54 is a portion to which the protector 60, which will be described below, is attached. The boss portions 54 each protrude rearward from a rear surface of the respective fixing protruding piece 52, and a screw hole 54a for fixing the protector is provided in the respective fixing protruding piece 52.

In each of the fixing protruding pieces 52, an area on the boss portion 54 side from the through hole 52a is configured to have lower rigidity than the rest of the portions. More specifically, a part of the extending portion includes a fragile portion that is formed to be thinner than the other portion or in which the extending portion is notched. In this way, the area the boss portion 54 side from the through hole 52a is configured to have a low rigidity. With this configuration, when a load that is equal to or larger than a specified value is input to the protector 60 fixed to the boss portion 54, the portion including the boss portion 54 in the fixing protruding piece 52 is deformed or split from another portion. As a result, breakage of the lid 50 is prevented.

The protector 60 is attached to the rear end portion of the housing 40. The protector 60 is a member that protects the inverter 10V and suppresses rearward movement of the brake booster 26 during interference (a collision) between the inverter 10V and the brake booster 26. The protector 60 also has a function of preventing a person from accessing the terminal block 33 of the DC input/output unit 32 carelessly.

Figure 12:
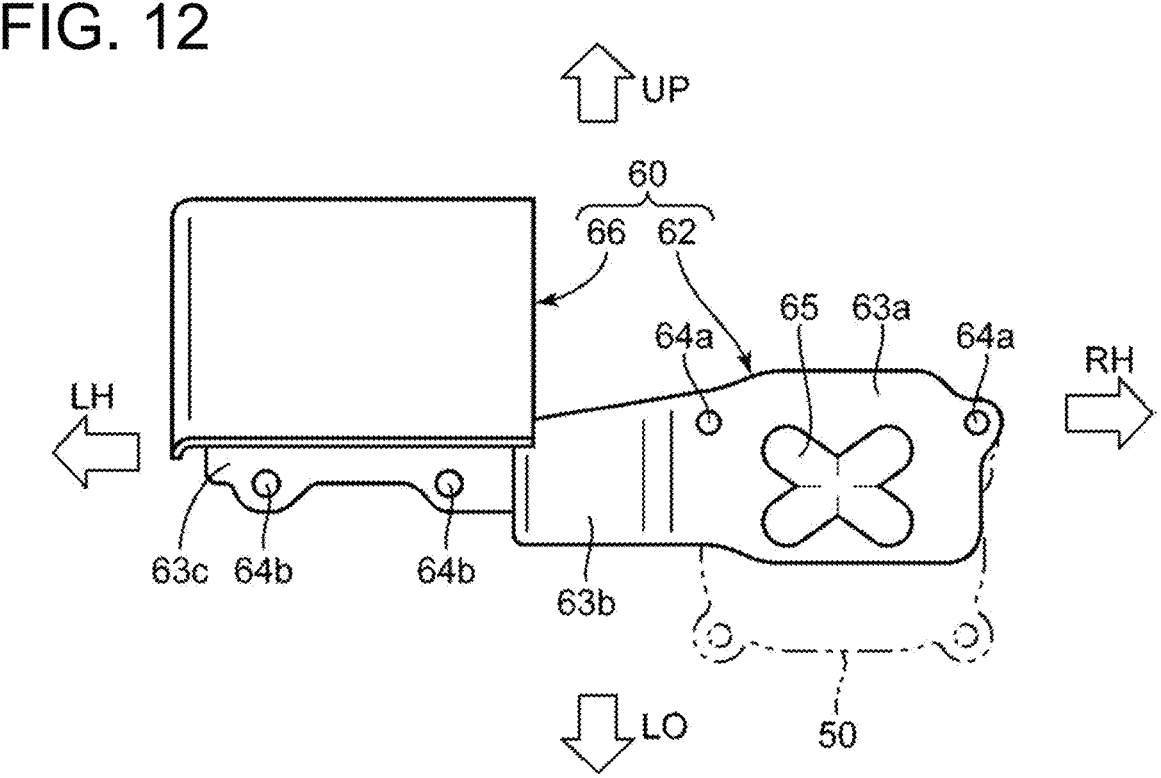
FIG. 12 is a back view of the protector.
Figure 13:
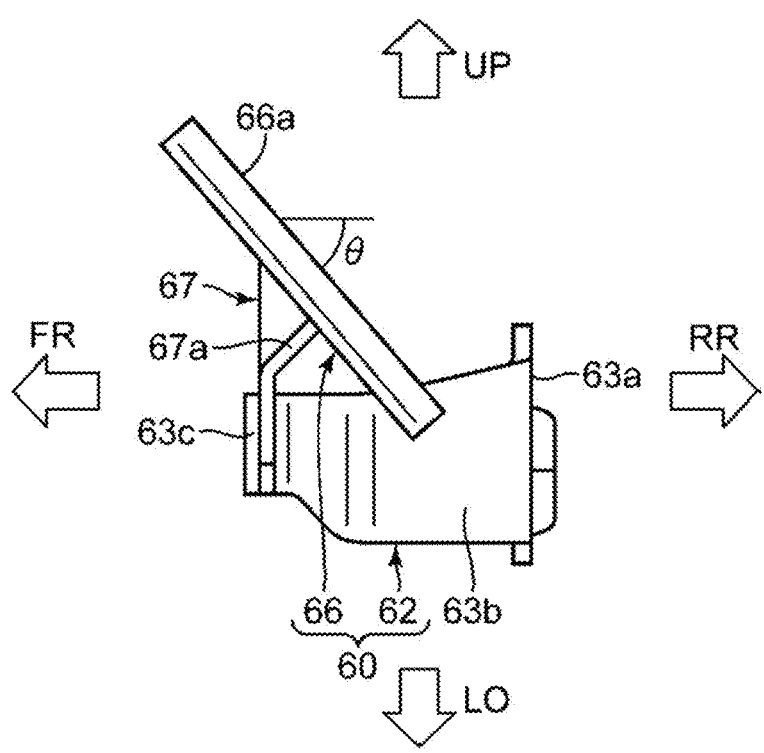
FIG. 13 is a side view of the protector.

FIGS. 12 and 13 each illustrate the protector 60. FIG. 12 is a back view (plan view when seen from behind) of the protector 60, and FIG. 13 is a side view (left view) of the protector 60.

As illustrated in FIGS. 5 to 8, 12, and 13, the protector 60 includes a guide portion 66 and a baffle plate 62. The guide portion 66 has a function of guiding the brake booster 26 upward in order to suppress the rearward movement of the brake booster 26 during a vehicle frontal collision.

The guide portion 66 is a rectangular member that is made of a metal plate, and has a front-upward inclined surface 66a that faces rearward and obliquely upward. The inclined surface 66a is a guide surface that guides the brake booster 26 upward during a collision with the brake booster 26. The inclined surface 66a is a flat surface. In this example, an inclination angle $\theta$ thereof with respect to a horizontal plane is set to 45°, for example. The guide portion 66 is joined to a fixed portion 63c, which will be described below, in the baffle plate 62 via a leg 67.

The baffle plate (baffle) 62 is formed of a metal plate and extends along a rear end surface of the housing 40 from a right end to a left end thereof. The baffle plate 62 includes a cover portion 63a, a coupling portion 63b, and the fixed portion 63c in this order from the right side in the vehicle width direction.

The cover portion 63a is a portion that opposes the lid 50 from behind and thereby covers a part of the lid 50. The fixed portion 63c is a portion that opposes a rear wall 44c of the lower housing 44 from behind in the left area ArL (see FIG. 7) of the housing 40. The fixed portion 63c is arranged ahead of the cover portion 63a. The coupling portion 63b is a portion between the cover portion 63a and the fixed portion 63c, and extends obliquely forward from a left end of the cover portion 63a and is connected to a right end of the fixed portion 63c in a plan view. That is, the protector 60 has a substantially crank-like shape in the plan view.

As described above, the guide portion 66 is joined to the fixed portion 63c of the baffle plate 62 via the leg 67. The leg 67 is a pressed member that is made of a metal plate and has a three-dimensional shape. As illustrated in FIG. 13, the leg 67 is configured to include a plate-shaped support portion 67a that extends forward and obliquely downward from the guide portion 66 along a direction (substantially normal direction) perpendicular to a plane of the inclined surface 66a in a side view.

The leg 67 is joined to each of a rear surface of the fixed portion 63c of the baffle plate 62 and a lower surface (surface opposite to the inclined surface 66a) of the guide portion 66 by welding. In this way, the guide portion 66 and the baffle plate 62 are integrally formed. Here, the leg 67 may be integrally formed with the fixed portion 63c of the baffle plate 62 by pressing. In this example, the guide portion 66 and the leg 67 are examples of a "guide member" in the present disclosure, and the guide portion 66 is an example of a "body portion" in the present disclosure.

In a state where the protector 60 is fixed to the housing 40, as illustrated in FIGS. 5 to 7, the guide portion 66 is arranged on the left side of the protruding portion 40a of the housing 40, that is, in the left area ArL. A rear end portion of the guide portion 66 is located substantially at the same position as a rear end portion of the protruding portion 40a, and an upper end portion of the guide portion 66 is located substantially at the same position as an upper end portion of the protruding portion 40a.

As illustrated in FIG. 1, the guide portion 66 arranged accordingly is located ahead of the booster body 27 of the brake booster 26 in the plan view. In addition, as illustrated in FIG. 2, the guide portion 66 is located at a height that is equal to a lower portion of the booster body 27, more specifically, an inclined surface 27a, which will be described below, of the booster body 27.

As illustrated in FIGS. 5 to 9B, the protector 60 is fixed to the protector attachment portion 47 that is provided in the left area ArL of the housing 40.

The protector attachment portion 47 is provided to the rear wall 44c of the lower housing 44 in the left area ArL with a clearance being interposed therebetween. More specifically, as illustrated in FIGS. 9A and 9B, the fastening portions 46 are each provided in a rear end portion of a side wall 44d at a left end of the lower housing 44 and a right end of the rear wall 44c of the lower housing 44 in the left area ArL, more precisely, a corner portion between the rear wall 44c and a side wall 44b of the lower housing 44 in the protruding portion 40a. As described above, each of the fastening portions 46 is the portion that is formed to be thicker than the rest of the peripheral wall portion of the lower housing 44.

The protector attachment portion 47 is provided in a bridge shape so as to straddle the two fastening portions 46. Then, bolts B2 are screwed into a pair of screw holes 47a, which are formed in the protector attachment portion 47, through a pair of through holes 64b formed in the fixed portion 63c of the baffle plate 62. As a result, the protector 60 is fixed to the protector attachment portion 47.

The protector attachment portion 47 is a wall portion (an example of a "first wall portion" in the present disclosure) that is provided in the housing 40 (lower housing 44) and opposes the brake booster 26 (booster body 27). A left end (one end) of the protector attachment portion 47 is connected to the rear end portion of the side wall 44d (an example of a "second wall portion" in the present disclosure) at the left end of the lower housing 44 via the fastening portion 46. Thus, the guide portion 66 is attached to the protector attachment portion 47 via the fixed portion 63c in an area that includes the left end of the protector attachment portion 47, that is, the rear end portion of the side wall 44d.

An inlet port 45A for a refrigerant (for example, a coolant) is made of a pipe material and provided in a lower portion at the rear end of the lower housing 44 in the left area ArL, and a similar outlet port 45B is provided in the front end portion of the lower housing 44 in the left area ArL. These ports 45A, 45B are respectively a refrigerant inlet and a refrigerant outlet, each of which communicates with a cooling passage provided in the housing 40. The refrigerant is introduced into the housing 40 from the inlet port 45A, flows through the housing 40 while meandering, and is discharged from the outlet port 45B. Just as described, the refrigerant circulates in the housing 40, and thereby cools the power module unit 36 and the like.

The inlet port 45A extends below the protector attachment portion 47 along the lower surface of the lower housing 44 and then extends to the rear of the protector attachment portion 47. Each of lower side portions of the protector attachment portion 47 and the baffle plate 62 (fixed portion 63c), which is fixed to the protector attachment portion 47, is formed to be recessed upward so as to avoid the inlet port 45A.

Figure 14:
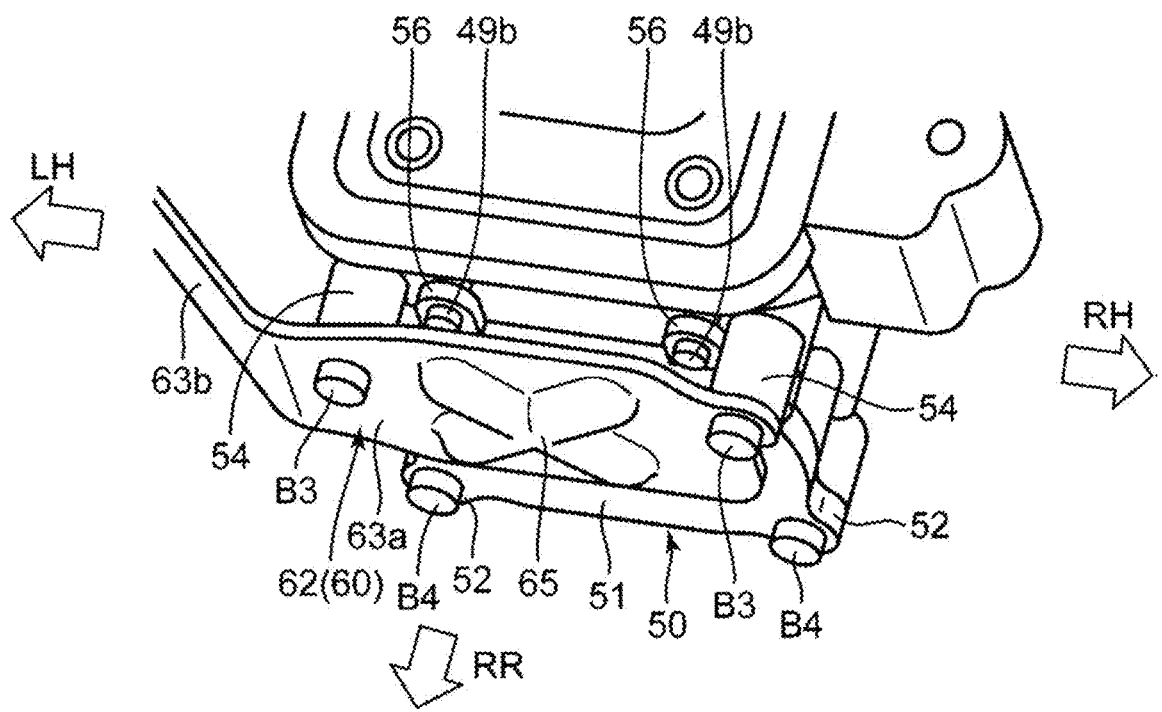
FIG. 14 is a perspective view of a main section illustrating an attachment structure of the protector (baffle plate).

The protector 60 is further fixed to the lid 50. More specifically, the cover portion 63a of the baffle plate 62 is formed with through holes 64a that correspond to the boss portions 54 of the lid 50. As illustrated in FIGS. 8 and 14, bolts B3 are screwed into the screw holes 54a of the boss portions 54 through the through holes 64a. In this way, the cover portion 63a is fixed to the lid 50. FIG. 14 is a perspective view of a main section of the inverter 10V illustrating an attachment structure of the protector 60 (cover portion 63a of the baffle plate 62).

In a state where the cover portion 63a is fixed to the lid 50, the cover portion 63a opposes the rear side of the lid 50, and thus, it can be said that the cover portion 63a is provided at a position that blocks an access path to the lid 50. More specifically, as illustrated in FIGS. 5 and 8, the cover portion 63a covers a substantially upper half portion of the lid 50 from behind and thereby hides the two upper bolts B4 that fix the lid 50. In this configuration, the lid 50 cannot be directly detached, and at least the baffle plate 62 has to be detached in order to access the terminal block 33. Thus, it is possible to suppress the lid 50 from being detached carelessly to access the terminal block 33.

In addition, in order to detach the baffle plate 62, it is required to detach the fixed portion 63c, which is fixed to the protector attachment portion 47, in addition to the cover portion 63a fixed to the lid 50. In this case, the fixed portion 63c is fixed to the protector attachment portion 47 that is located at a position deep ahead the lid 50 fixed to the rear end of the protruding portion 40a. Furthermore, as illustrated in FIGS. 5 to 7, the guide portion 66 is disposed above the fixed portion 63c, which is fixed to the protector attachment portion 47, and thus the fixed portion 63c cannot be directly and visually recognized in an upper view. Thus, it is difficult to access the fixed portion 63c from the opening of the compartment R1. Accordingly, with these points, it is possible to suppress the lid 50 from being detached carelessly to access the terminal block 33.

Configuration of Brake Booster 26

As described above, the brake booster 26 includes the booster body 27 that is fixed to the dashboard 16 via the bracket, and the input portion 28 for inputting the depression force by the occupant to the booster body 27.

As illustrated in FIG. 2, the booster body 27 has a substantially box shape, and is fixed to the dashboard 16 while keeping a posture in which the front-end portion thereof faces slightly upward. At a lower front end of the booster body 27, the front-upward inclined surface 27a that faces forward and obliquely downward is formed. The inclined surface 27a is a flat surface and opposes the inclined surface 66a of the guide portion 66 in the protector 60 from behind.

Figure 15:
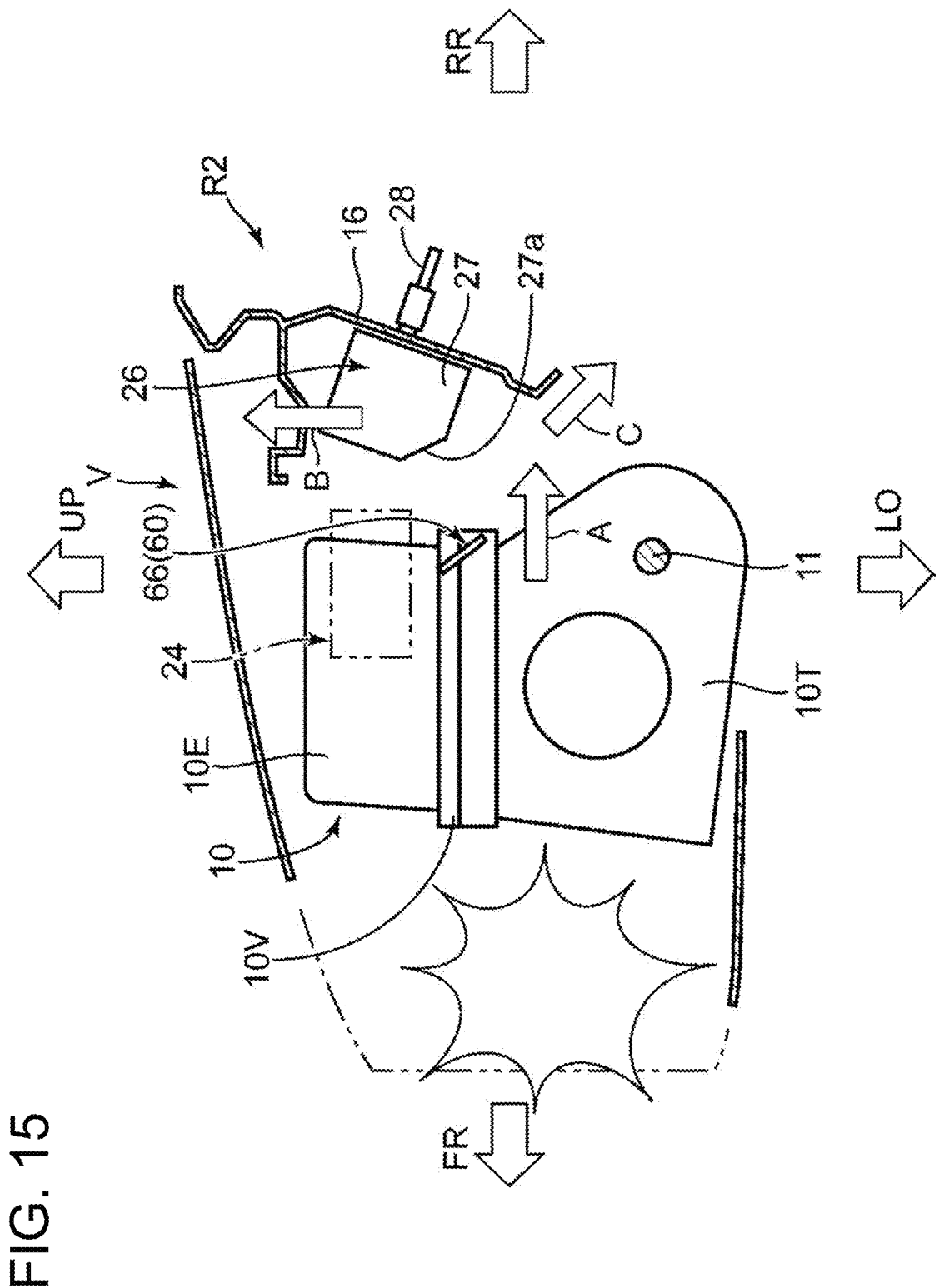
FIG. 15 is a schematic view illustrating behavior of the powertrain (inverter) and a brake booster during a vehicle frontal collision.

Behavior of Powertrain 10 and Brake Booster 26 During Vehicle Frontal Collision FIG. 15 is a schematic view illustrating behavior of the powertrain 10 (inverter 10V) and the brake booster during the vehicle frontal collision.

When the frontal collision occurs to the vehicle V, the inverter 10V moves rearward together with the powertrain 10 (an arrow A), and the inverter 10V collides (interferes) with the rear brake booster 26 via the protector 60. More specifically, first, the inverter 10V collides with the brake booster 26 via the inclined surface 66a of the guide portion 66. The inclined surface 66a of the guide portion 66 is the front-upward inclined surface. Thus, when the guide portion 66 collides with the brake booster 26, the brake booster 26 is displaced upward (an arrow B), and the powertrain 10 is displaced downward (an arrow C). In this case, when the inclined surface 27a at the lower front end of the booster body 27 and the inclined surface 66a of the guide portion 66 abut each other, the powertrain 10 and the brake booster 26 are displaced from each other along the inclined surfaces 27a, 66a.

As a result of the upward displacement of the brake booster 26, the brake booster 26 is prevented from moving rearward together with the dashboard 16 and entering the cabin R2.

Figure 16:
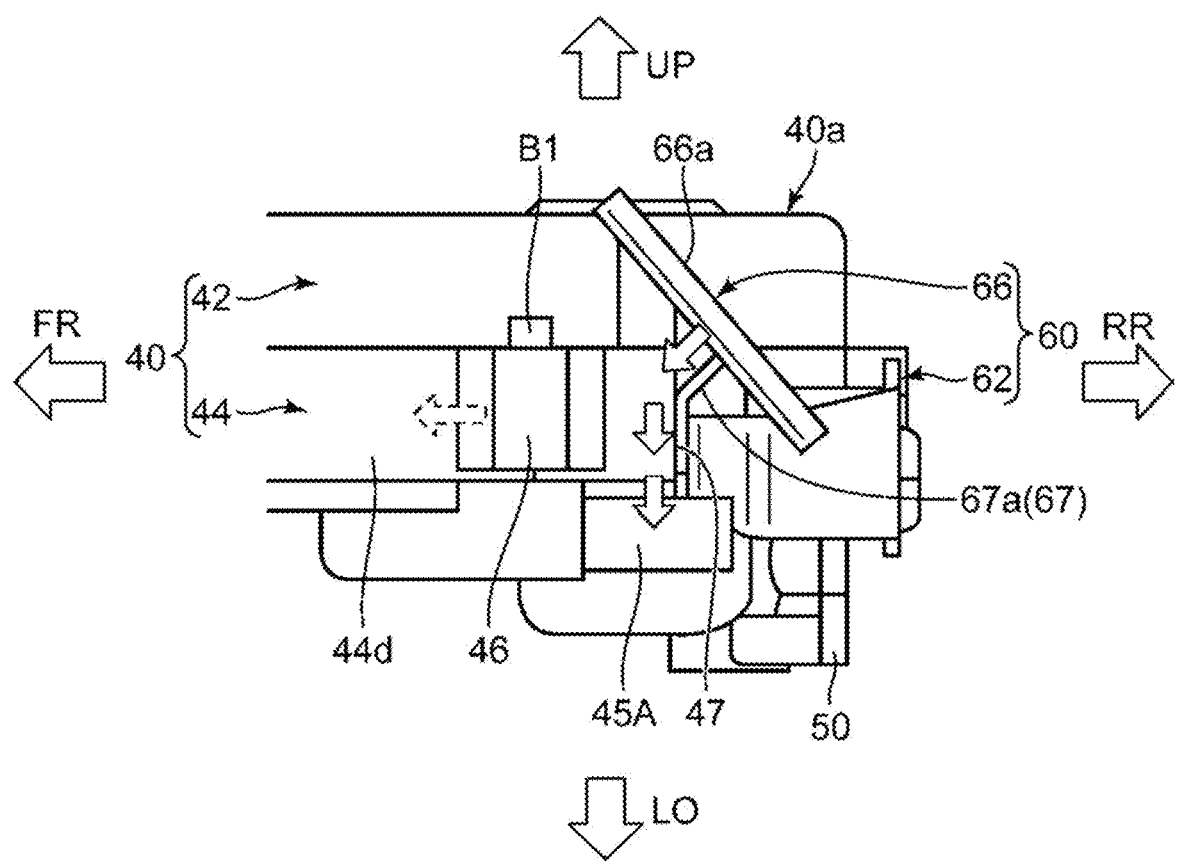
FIG. 16 is a view illustrating transmission of a collision load.

FIG. 16 is a view illustrating transmission of the load when the inverter 10V (guide portion 66) and the brake booster 26 collide with each other. When the guide portion 66 collides with the brake booster 26, a collision load is input to the guide portion 66.

Since the guide portion 66 itself is not fixed to the housing 40, the collision load is transmitted to the housing 40 via the leg 67 and the fixed portion 63c (protector 60). In this case, since the leg 67 is provided with the support portion 67a, which extends in the direction perpendicular to the plane of the inclined surface 66a, a load component in the direction perpendicular to the plane is promptly transmitted to the housing 40 via the support portion 67a and is distributed into the motor 10M and the transaxle 10T (see solid arrows in FIG. 16).

The guide portion 66 is fixed to the lower housing 44 at the left end of the protector attachment portion 47, that is, in the rear end portion of the side wall 44d, which extends in the front-rear direction, via the leg 67 and the fixed portion 63c. Thus, the collision load is transmitted to the side wall 44d, which extends in the front-rear direction of the housing 40 and has relatively high bearing strength, and is distributed (see the broken line arrow in FIG. 16).

Effects

As it has been described so far, in the front structure of the vehicle V according to the present embodiment, the protector 60 is attached to the rear end portion of the inverter 10V, which is provided in the powertrain 10, and the protector 60 is provided with the guide portion 66, which has the inclined surface for displacing the brake booster 26 upward, specifically, the front-upward inclined surface 66a. Accordingly, during the vehicle frontal collision, as described above, the guide portion 66 abuts the brake booster 26, and the brake booster 26 is displaced upward. Thus, it is possible to prevent the brake booster 26 from moving rearward and entering the cabin R2, and as a result, the safety of the occupant is improved.

Since the inverter 10V and the brake booster 26 collide with each other via the guide portion 66 (protector 60), the inverter 10V and the brake booster 26 do not directly collide with each other. Thus, compared to a case where the inverter 10V and the brake booster 26 directly collide with each other, the powertrain 10 is less likely to be damaged, and power leakage and the like caused by the damage can be effectively avoided.

In the present embodiment, the inverter 10V is fixed onto the top of the motor 10M and the transaxle 10T via the housing 40 thereof, and the guide portion 66 is attached to the housing 40 via the fixed portion 63c. That is, since the housing 40 is fixed to the motor 10M and the transaxle 10T, each of which has the relatively high rigidity, support rigidity of the guide portion 66, which is attached to the inverter 10V, is improved. Thus, it is possible to further reliably displace the brake booster 26 upward while receiving the collision load with the brake booster 26 by the guide portion 66.

In particular, the housing 40 includes the lower housing 44 that is fixed to the motor 10M and the transaxle 10T; and the upper housing 42 coupled thereto, and the guide portion 66 (fixed portion 63c) is fixed to the lower housing 44. That is, in the housing 40, the collision load with the brake booster 26 is input to the portion near the motor 10M and the transaxle 10T. Thus, it is possible to further promptly distribute the collision load with the brake booster 26 from the housing 40 (lower housing 44) to the motor 10M and the transaxle 10T, and as a result, the damage to the inverter 10V and the guide portion 66 can be effectively avoided.

In this case, in the present embodiment, the lower housing 44 is fastened to the motor 10M and the transaxle 10T by the fastening portion 46, which is formed to be thicker than the rest of the portions, and the guide portion 66 (fixed portion 63c) is attached to the protector attachment portion 47, which is provided in the bridge shape to the two fastening portions 46. That is, it can be said that the guide portion 66 (fixed portion 63c) is substantially attached to the fastening portion 46. Thus, it is possible to further reliably transmit the collision load with the brake booster 26 to the motor 10M and the transaxle 10T via the lower housing 44, which is advantageous to avoid the damage to the inverter 10V and the guide portion 66.

Further, in the present embodiment, as described above, the lower housing 44 includes the protector attachment portion 47 that has the surface opposing the brake booster 26, and the side wall 44d that is connected to the left end of the protector attachment portion 47 via the fastening portion 46. The guide portion 66 (fixed portion 63c) is attached to the protector attachment portion 47 in the area including the left end thereof. Accordingly, it is possible to distribute the collision load with the brake booster 26 while receiving the collision load by the side wall 44d having the relatively high bearing strength in the housing 40, that is, the side wall 44d, which extends in the front-rear direction. Thus, this is advantageous to suppress the deformation of the housing 40 by the collision load, and thus the damage to the inverter 10.

In the present embodiment, the guide portion 66 itself of the protector 60 is separated from the housing 40, and the collision load is input to the housing 40 via the leg 67 and the fixed portion 63c. Thus, the housing 40 is less likely to be damaged by the collision load, and it is also advantageous to suppress the damage to the inverter 10V in this respect.

In this case, since the leg 67 is provided with the support portion 67a, which extends forward along the direction perpendicular to the plane of the inclined surface 66a (guide portion 66), as described above, the load component of the collision load, which is in the direction perpendicular to the plane, is promptly transmitted to the housing 40 via the support portion 67a and is distributed to the motor 10M and the transaxle 10T. Thus, it is further advantageous to suppress the damage to the inverter 10.

In the present embodiment, the inclined surface 27a is provided in the lower front end portion of the brake booster 26 (booster body 27), and when the guide portion 66 and the brake booster 26 collide with each other, the inclined surfaces 27a, 66a abut each other. Thus, it is possible to displace the brake booster 26 upward further smoothly.

Modified Examples, Etc.

The front structure of the vehicle V that has been described so far is an example of the preferred embodiment of the present disclosure, and the specific configuration thereof can be appropriately changed without departing from the gist of the present disclosure. For example, the following configuration can be applied.

(1) Although not specifically described in the embodiment, the housing 40 may be configured that the rigidity of the lower housing 44 is higher than that of the upper housing 42. As described above, the collision load that is input from the guide portion 66 is transmitted to the upper housing 42. Thus, according to this configuration, it is possible to avoid the damage to the housing 40 with the rational configuration of only increasing the rigidity of the collision load input portion in the housing 40.

(2) In the embodiment, the protector 60 including the baffle plate 62 and the guide portion 66 is fixed to the housing 40, and the guide portion 66 is thereby provided in the inverter 10V. However, it may be configured that only the portion corresponding to the guide portion 66 and the leg 67 in the protector 60 is directly attached to the protector attachment portion 47. With this configuration, it is possible to make the inverter 10V including the guide portion 66 compact while securing the function of suppressing the rearward movement of the brake booster 26.

(3) In the embodiment, the inclination angle θ of the inclined surface 66a in the guide portion 66 is 45°. However, this is merely an example, and the inclination angle θ can be appropriately changed according to the specific position and shape of the brake booster 26. In this case, when the positions of the lower front-end portion of the dashboard 16 and the guide portion 66 (inverter 10V) are relatively close to each other in the up-down direction, the inclination angle θ can be set to be smaller than 45°.

(4) In the embodiment, the inverter 100 is applied as an example of the power converter. However, in the present disclosure, a device other than the inverter can also be applied as the power converter. For example, a DC/DC converter may be adopted as the power converter.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST

V vehicle
R1: compartment
R2: cabin
10: powertrain
10E: engine
10M: motor
10T: transaxle
10V: inverter (power converter)
16: dashboard
20: battery
26: brake booster
27: booster body
27a: inclined surface
40: inverter housing
60: protector
62: baffle plate
66: guide portion (guide member/body portion)
66a: inclined surface
67: leg
67a: support portion

The invention claimed is:

1. A vehicle front structure comprising:
a power converter that is arranged in a compartment in a front portion of a vehicle and converts electric power between a travel motor and a battery; and
an auxiliary machine arranged at a position that is behind the power converter in the compartment and at which the auxiliary machine overlaps the power converter when seen in a vehicle front-rear direction, wherein
a guide member is attached to at least a portion of one of the power converter and the auxiliary machine, the portion opposing the other of the power converter and the auxiliary machine, and the guide member including an inclined surface that abuts the other in conjunction with rearward movement of the power converter during a vehicle frontal collision and thereby displaces the auxiliary machine relatively upward,
the guide member is attached to a rear end portion of the power converter,
the inclined surface is raised forward in the vehicle front-rear direction,
the power converter includes:
a circuit unit that converts the electric power; and
a converter housing in which the circuit unit is accommodated, the circuit unit being fixed to an upper portion of a drive system including the motor via the converter housing,
the guide member is attached to the converter housing,
the converter housing includes:
a lower housing that is fixed to the drive system; and
an upper housing that is joined to the lower housing, and
the guide member is attached to the lower housing.

2. The vehicle front structure of claim 1, wherein
the guide member is attached to at least a portion of the power converter, the portion opposing the auxiliary machine, and the guide member including an inclined surface that abuts the auxiliary machine in conjunction with rearward movement of the power converter during a vehicle frontal collision and thereby displaces the auxiliary machine relatively upward.

3. The vehicle front structure of claim 1, wherein
the guide member is attached to at least a portion of the auxiliary machine, the portion opposing the power converter, and the guide member including an inclined surface that abuts the power converter in conjunction with rearward movement of the power converter during a vehicle frontal collision and thereby displaces the auxiliary machine relatively upward.

4. The vehicle front structure according to claim 1, wherein
the lower housing includes a fastening portion therearound, the fastening portion being formed thicker than another portion and fastened to the drive system by a fastening member, and
the guide member is attached to the fastening portion or a portion adjacent to the fastening portion.

5. The vehicle front structure according to claim 1, wherein
the converter housing includes:
   a first wall portion that includes a surface opposing the auxiliary machine in the vehicle front-rear direction; and
   a second wall portion that extends forward in the vehicle front-rear direction from one end of the first wall portion, and
the guide member is attached to the first wall portion in an area including the one end.

6. The vehicle front structure according to claim 1, wherein
the guide member includes:
   a body portion that has the inclined surface; and a leg that is fixed to the converter housing, and
the body portion is separated from the converter housing.

7. The vehicle front structure according to claim 6, wherein the leg has a portion that extends forward in the vehicle front-rear direction along a direction perpendicular to a plane of the inclined surface.

8. The vehicle front structure according to claim 1, wherein the auxiliary machine has a front-upward inclined surface that opposes the inclined surface of the guide member in the vehicle front-rear direction.

9. The vehicle front structure according to claim 1, wherein the auxiliary machine is a brake booster.

10. A vehicle front structure comprising:
a power converter that is arranged in a compartment in a front portion of a vehicle and converts electric power between a travel motor and a battery; and
an auxiliary machine arranged at a position that is behind the power converter in the compartment and at which the auxiliary machine overlaps the power converter when seen in a vehicle front-rear direction, wherein
a guide member is attached to at least a portion of one of the power converter and the auxiliary machine, the portion opposing the other of the power converter and the auxiliary machine, and the guide member including an inclined surface that abuts the other in conjunction with rearward movement of the power converter during a vehicle frontal collision and thereby displaces the auxiliary machine relatively upward,
the guide member is attached to a rear end portion of the power converter,
the inclined surface is raised forward in the vehicle front-rear direction,
the power converter includes:
   a circuit unit that converts the electric power; and
   a converter housing in which the circuit unit is accommodated, the circuit unit being fixed to an upper portion of a drive system including the motor via the converter housing,
the guide member is attached to the converter housing
the converter housing includes:
   a first wall portion that includes a surface opposing the auxiliary machine in the vehicle front-rear direction; and
   a second wall portion that extends forward in the vehicle front-rear direction from one end of the first wall portion, and
the guide member is attached to the first wall portion in an area including the one end.

11. A vehicle front structure comprising:
a power converter that is arranged in a compartment in a front portion of a vehicle and converts electric power between a travel motor and a battery; and
an auxiliary machine arranged at a position that is behind the power converter in the compartment and at which the auxiliary machine overlaps the power converter when seen in a vehicle front-rear direction, wherein
a guide member is attached to at least a portion of one of the power converter and the auxiliary machine, the portion opposing the other of the power converter and the auxiliary machine, and the guide member including an inclined surface that abuts the other in conjunction with rearward movement of the power converter during a vehicle frontal collision and thereby displaces the auxiliary machine relatively upward,
the guide member is attached to a rear end portion of the power converter,
the inclined surface is raised forward in the vehicle front-rear direction,
the power converter includes:
   a circuit unit that converts the electric power; and
   a converter housing in which the circuit unit is accommodated, the circuit unit being fixed to an upper portion of a drive system including the motor via the converter housing,
the guide member is attached to the converter housing,
the guide member includes a body portion that has the inclined surface; and a leg that is fixed to the converter housing,
the body portion is separated from the converter housing, and
the leg has a portion that extends forward in the vehicle front-rear direction along a direction perpendicular to a plane of the inclined surface.

* * * * *